United States Patent
Harding et al.

(10) Patent No.: US 11,598,525 B2
(45) Date of Patent: Mar. 7, 2023

(54) COMBUSTION CHAMBER WITH PARTICLE SEPARATOR

(71) Applicant: Rolls-Royce plc, London (GB)

(72) Inventors: Stephen C Harding, Derby (GB); Frederic Witham, Derby (GB)

(73) Assignee: ROLLS ROYCE PLC, London (GB)

( * ) Notice: Subject to any disclaimer, the term of this patent is extended or adjusted under 35 U.S.C. 154(b) by 15 days.

(21) Appl. No.: 17/149,266

(22) Filed: Jan. 14, 2021

(65) Prior Publication Data

US 2021/0222880 A1 Jul. 22, 2021

(30) Foreign Application Priority Data

Jan. 21, 2020 (GB) ...................................... 2000870

(51) Int. Cl.
| | |
|---|---|
| F02C 7/052 | (2006.01) |
| F23R 3/00 | (2006.01) |
| F02C 7/18 | (2006.01) |
| F23R 3/06 | (2006.01) |

(52) U.S. Cl.
CPC ............. *F23R 3/002* (2013.01); *F02C 7/052* (2013.01); *F02C 7/18* (2013.01); *F23R 3/06* (2013.01); *F05D 2220/323* (2013.01); *F05D 2240/35* (2013.01); *F05D 2260/201* (2013.01); *F23R 2900/03041* (2013.01); *F23R 2900/03043* (2013.01); *F23R 2900/03045* (2013.01)

(58) Field of Classification Search
CPC ............ F23R 3/002; F23R 2900/03045; F23R 2900/03043; F23R 2900/03041; F23R 2900/03042; F23R 2900/03044; F23R 2900/00004; F02C 7/052
See application file for complete search history.

(56) References Cited

U.S. PATENT DOCUMENTS

| | | | | |
|---|---|---|---|---|
| 5,353,865 | A | * 10/1994 | Adiutori | F28F 13/185 165/908 |
| 6,513,331 | B1 | * 2/2003 | Brown | F23R 3/06 60/754 |

(Continued)

FOREIGN PATENT DOCUMENTS

| | | |
|---|---|---|
| EP | 3 147 567 A1 | 3/2017 |
| EP | 3 502 562 A1 | 6/2019 |

(Continued)

OTHER PUBLICATIONS

Jun. 4, 2021 extended Search Report issued in European Patent Application No. 20215892.9.

*Primary Examiner* — Thomas P Burke
(74) *Attorney, Agent, or Firm* — Oliff PLC

(57) ABSTRACT

A combustion chamber (15) comprising a wall at least partially defining a combustion zone and having a first surface (41) facing away from the combustion zone and a second surface (43) facing the combustion zone, the wall having at least one effusion cooling aperture (69, 73) extending there-through from the first surface to the second surface, the effusion cooling aperture having an inlet in the first surface and an outlet in the second surface, the first surface having a particle separator (84) at least partially located upstream of the inlet of the effusion cooling aperture, the particle separator projecting away from the first surface and away from the combustion zone.

14 Claims, 7 Drawing Sheets

(56) References Cited

U.S. PATENT DOCUMENTS

| | | | |
|---|---|---|---|
| 2012/0255308 A1* | 10/2012 | Chandler | F23R 3/002 60/754 |
| 2013/0205793 A1* | 8/2013 | Xu | F01D 9/065 60/754 |
| 2014/0096528 A1 | 4/2014 | Cunha et al. | |
| 2014/0238030 A1 | 8/2014 | Gerendas | |
| 2015/0198090 A1 | 7/2015 | Howe et al. | |
| 2016/0061451 A1 | 3/2016 | Dudebout et al. | |
| 2016/0238249 A1* | 8/2016 | Cunha | F23R 3/007 |
| 2017/0089580 A1* | 3/2017 | Hu | F23R 3/002 |
| 2017/0191417 A1* | 7/2017 | Bunker | F01D 25/12 |
| 2017/0307217 A1* | 10/2017 | Clemen | F23R 3/04 |
| 2018/0306114 A1 | 10/2018 | Dudebout et al. | |
| 2019/0078472 A1* | 3/2019 | Tan | F01D 25/32 |
| 2019/0353351 A1* | 11/2019 | Bunel | F02C 7/22 |
| 2021/0025591 A1* | 1/2021 | Pritchard | F23R 3/002 |

FOREIGN PATENT DOCUMENTS

| | | |
|---|---|---|
| GB | 2356041 A | 5/2001 |
| GB | 2356042 A | 5/2001 |
| GB | 2 384 046 A | 7/2003 |
| WO | 2015/050592 A2 | 4/2015 |

\* cited by examiner

COMBUSTION CHAMBER WITH PARTICLE SEPARATOR

CROSS-REFERENCE TO RELATED APPLICATIONS

This specification is based upon and claims the benefit of priority from UK Patent Application Number 2000870.2 filed on Jan. 21, 2020, the entire contents of which are incorporated herein by reference.

BACKGROUND

1. Field of the Disclosure

The present disclosure relates to a combustion chamber, a combustion chamber tile and a combustion chamber segment and in particular to a gas turbine engine combustion chamber, a gas turbine engine combustion chamber tile and a gas turbine engine combustion chamber segment.

2. Description of the Related Art

One known type of combustion chamber comprises one or more walls each of which comprises a double, or dual, wall structure. A dual wall structure comprises an annular outer wall and an annular inner wall spaced radially from the annular outer wall to define one or more chambers. The annular outer wall has a plurality of impingement cooling apertures to supply coolant into the chamber, or chambers, and the annular inner wall has a plurality of effusion cooling apertures to supply coolant from the chamber, or chambers, over an inner surface of the annular inner wall to provide a film of coolant on the inner surface of the annular inner wall. The film of coolant protects the inner surface of the annular inner wall.

The annular inner wall generally comprises a plurality of rows of tiles arranged side by side between the upstream end of the combustion chamber and the downstream end of the combustion chamber and each row of tiles comprises a plurality of tiles arranged circumferentially side by side around the combustion chamber. Each tile comprises a main body having a first surface facing the annular outer wall and a second surface facing away from the annular outer wall and towards a combustion zone, each tile has a peripheral wall which extends around the edges of the tile and projects from the first surface towards the annular outer wall to space the tile from the annular outer wall to form at least one chamber. Each tile is secured to the annular outer wall by one or more attachment features. For example each tile is secured to the annular outer wall by one or more threaded studs which pass through respective apertures in the annular outer wall and a nut is provided on each threaded stud to secure the tile on the annular outer wall. Each tile has a plurality of effusion cooling apertures to supply coolant from the at least one chamber over an inner surface, the second surface, of the tile to provide a film of coolant on the inner surface, the second surface, of the tile. The film of coolant protects the inner surface of the tile.

Alternatively, the annular wall comprises a plurality of combustion chamber segments arranged circumferentially side by side around the combustion chamber and each combustion chamber segment extends the full axial length of the combustion chamber. Each combustion chamber segment comprises an outer wall and an inner wall spaced from the outer wall, each combustion chamber segment has a peripheral wall which extends around the edges of the combustion chamber segment between the outer wall and the inner wall to space the inner wall from the outer wall and to define at least one chamber. Each combustion chamber segment has a plurality of effusion cooling apertures to supply coolant from the at least one chamber over an inner surface of the combustion chamber segment to provide a film of coolant on the inner surface of the combustion chamber segment. The film of coolant protects the inner surface of the combustion chamber segment.

Another known type of combustion chamber comprises one or more walls each of which comprises a single wall structure. A single wall structure simply comprises an annular wall. The annular wall has a plurality of effusion cooling apertures to supply coolant from an outer surface through the annular wall and over an inner surface of the annular wall to provide a film of coolant on the inner surface of the annular wall. The film of coolant protects the inner surface of the annular wall.

Generally the smaller the diameter, or cross-sectional area, of the effusion cooling aperture the better is the cooling performance of the effusion cooling aperture. However, an effusion cooling aperture with a very small diameter, or cross-sectional area, is more prone to blockage by sand, dust, grit, volcanic ash, etc. that is ingested into the gas turbine engine. The particles of sand, dust, grit, volcanic ash etc. may become lodged in the inlet of an effusion cooling aperture and block, or at least partially block, the effusion cooling aperture. Furthermore, some methods of manufacturing the effusion cooling apertures may reduce the minimum cross-sectional area of the effusion cooling aperture and further increase the propensity for blockage of the effusion cooling aperture. In particular effusion cooling apertures manufactured by additive manufacturing, or additive layer manufacturing, tend to produce effusion cooling apertures tend to produce circular cross-sectional effusion cooling apertures which are not circular.

Accordingly the present disclosure seeks to provide a combustion chamber, a combustion chamber tile and a combustion chamber segment which reduces, or overcomes, the above mentioned problem.

SUMMARY

According to a first aspect there is provided a combustion chamber comprising a wall at least partially defining a combustion zone, the wall having an upstream end and a downstream end, the wall having a first surface facing away from the combustion zone and a second surface facing the combustion zone, the wall having at least one effusion cooling aperture extending there-through from the first surface to the second surface, the effusion cooling aperture having an inlet in the first surface and an outlet in the second surface, the first surface having a particle separator at least partially located upstream of the inlet of the effusion cooling aperture, the particle separator projecting away from the first surface and away from the combustion zone, the particle separator having a distal end remote from the inlet of the effusion cooling aperture and a proximal end adjacent to the inlet of the effusion cooling aperture, the particle separator having a maximum height above the first surface at a location spaced from the proximal end, the particle separator increasing in height in a direction from the distal end towards the proximal end to the maximum height.

The particle separator may be triangular in cross-section.

The particle separator may have a first portion adjacent the distal end, a second portion adjacent the proximal end and a third portion between the first portion and the second portion. The third portion may increase in height at a constant rate between the first portion and the maximum height. The maximum height may be at the junction between the third portion and the second portion. The first portion may have a curved surface from the first surface of the wall to the third portion, the third portion having a linear surface. The second portion may have a linear surface. The second portion may comprise a curved surface. The second portion may comprise two curved surfaces. The second portion may comprise a first curved surface, a second curved surface and a linear surface between the first curved surface and the second curved surface.

The first curved surface, the linear surface and the curved second surface being arranged in series between the junction with the third portion and the first surface of the wall. The linear surface may be arranged perpendicularly to the first surface of the wall. The maximum height of the particle separator may be equal to or greater than the diameter of the effusion cooling aperture.

The first curved surface may be an arc of a circle. The arc of the circle may have a radius of one tenth of the diameter of the effusion cooling aperture. The arc of the circle may have a radius of 0.05 mm. The second curved surface may be an arc of a circle. The arc of the circle may have a radius of three tenths to twelve tenths of the diameter of the effusion cooling aperture. The arc of the circle may have a radius of 0.15 mm to 0.6 mm. The curved surface of the first portion may be an arc of a circle. The arc of the circle may have a radius of four to twelve times the diameter of the effusion cooling aperture. The arc of the circle may have a radius of 2 mm to 6 mm.

The effusion cooling aperture may have a diameter of 0.3 to 1.0 mm. The effusion cooling aperture may have a diameter of 0.5 mm. The effusion cooling aperture may be arranged perpendicularly to the first surface. The effusion cooling aperture may be arranged at an angle of 20° to 50° to the first surface.

The particle separator may have a rectangular base. The particle separator may have a lateral dimension greater than the diameter of the effusion cooling aperture. The lateral dimension of the particle separator may be up to three times the diameter of the effusion cooling aperture. The particle separator may be arranged such that the middle of the particle separator is aligned with the centre of the effusion cooling aperture. The particle separator may be arranged such that the middle of the particle separator is aligned with an edge of the effusion cooling aperture. The particle separator may be wedge shaped.

The proximal end of the particle separator may curve around the effusion cooling aperture. The third portion may be arranged at an angle of 25° to 50° to the first surface. The third portion may be arranged at an angle of 30° to the first surface. The particle separator may have a part annular base. The first portion may have a curved surface from the first surface of the wall to the third portion, the third portion having a frusto-conical surface.

The inlet of the effusion cooling aperture in the first surface may be circular, elliptical, race-track or other suitable shape. The effusion cooling aperture may have a circular cross-section or a rectangular cross-section.

The particle separator may overhang the inlet of the effusion cooling aperture. The linear surface may be arranged at an angle of 30° to 80° to the first surface of the wall. The linear surface may be arranged at an angle of 40° to 75° to the first surface of the wall.

The wall may have a plurality of effusion cooling apertures. The first surface of the wall may have a plurality of particle separators, each particle separator is located at least partially upstream of the inlet of a respective one of a plurality of effusion cooling apertures. The wall may have a first plurality of effusion cooling apertures, the first surface of the wall having a plurality of particle separators, each particle separator is located at least partially upstream of the inlet of a respective one of the first plurality of effusion cooling apertures, a second plurality of effusion cooling apertures, and the second plurality of effusion cooling apertures having a greater cross-sectional area than the first plurality of effusion cooling apertures. The second plurality of effusion cooling apertures may be located downstream of the first plurality of effusion cooling apertures. The second plurality of effusion cooling apertures may be interspersed, distributed at intervals, within the first plurality of effusion cooling apertures.

The effusion cooling apertures may be arranged in a plurality of rows, each row comprising a plurality of effusion cooling apertures. The effusion cooling apertures in adjacent rows may be staggered with respect to each other.

The wall may be an annular wall defining at least partially defining the combustion zone. The annular wall may be a radially inner annular wall of an annular combustion chamber or a radially outer annular wall of an annular combustion chamber.

The wall may be a combustion chamber tile defining at least partially defining the combustion zone, the combustion chamber tile being removably secured to an annular wall. The combustion chamber tile may be removably secured to a radially inner annular wall of an annular combustion chamber or removably secured to a radially outer annular wall of an annular combustion chamber. There may be a plurality of combustion chamber tiles. Each combustion chamber tile may be removably secured to the annular wall. Each combustion chamber tile may comprise a main body having a first surface facing the annular wall and a second surface facing away from the annular wall and towards the combustion zone, each combustion chamber tile having a peripheral wall extending around the edges of the combustion chamber tile and projecting from the first surface towards the annular wall to space the tile from the annular wall. The main body and the peripheral wall of each combustion chamber tile may comprise a monolithic structure consisting of consolidated powder material.

The wall may be a combustion chamber segment defining at least partially the combustion zone, the combustion chamber segment being arranged circumferentially side by side with other combustion chamber segments to form the combustion chamber. The combustion chamber segment comprising an outer wall and an inner wall spaced from the outer wall, the combustion chamber segment having a peripheral wall extending around the edges of the combustion chamber segment between the outer wall and the inner wall to space the inner wall from the outer wall and to define at least one chamber, the inner wall of the combustion chamber segment having a first surface facing the outer wall of the combustion chamber segment and a second surface facing away from the outer wall of the combustion chamber segment and towards a combustion zone, the combustion chamber segment having an effusion cooling aperture extending through the inner wall from the first surface to the second surface, the effusion cooling aperture having an inlet in the first surface and an outlet in the second surface, the effusion cooling aperture having a diameter, the first surface having a particle separator located upstream of the inlet of the effusion cooling aperture, the particle separator projecting from the first surface towards the outer wall but being spaced from the outer wall, the particle separator having a distal end remote from the effusion cooling aperture and a proximal end adjacent to the effusion cooling aperture, the particle separator having a maximum height upstream of the proximal end, the particle separator increasing in height in a direction from the distal end to towards the proximal end to the maximum height.

According to a second aspect there is provided a combustion chamber comprising an annular wall and a plurality of combustion chamber tiles, each combustion chamber tile being removably secured to the annular wall, each combustion chamber tile comprising a main body having a first surface facing the annular wall and a second surface facing away from the annular wall and towards a combustion zone, each combustion chamber tile having a peripheral wall extending around the edges of the combustion chamber tile and projecting from the first surface towards the annular wall to space the combustion chamber tile from the annular wall, at least one of the combustion chamber tiles having an effusion cooling aperture extending through the main body from the first surface to the second surface, the effusion cooling aperture having an inlet in the first surface and an outlet in the second surface, the effusion cooling aperture having a diameter, the first surface having a particle separator located upstream of the inlet of the effusion cooling aperture, the particle separator projecting from the first surface towards the annular wall but being spaced from the annular wall, the particle separator having a distal end remote from the effusion cooling aperture and a proximal end adjacent to the effusion cooling aperture, the particle separator having a maximum height upstream of the proximal end, the particle separator increasing in height in a direction from the distal end to towards the proximal end to the maximum height.

The first surface of at least one of the combustion chamber tiles may have a plurality of particle separators, each particle separator is located at least partially upstream of the inlet of a respective one of a plurality of effusion cooling apertures. The first surface of a plurality of the combustion chamber tiles may have a particle separator located at least partially upstream of the inlet of an effusion cooling apertures. The first surface of a plurality of combustion chamber tiles may have a plurality of particle separators, each particle separator is located at least partially upstream of the inlet of a respective one of a plurality of effusion cooling apertures. The first surface of each of the combustion chamber tiles may have a particle separator located at least partially upstream of the inlet of an effusion cooling apertures. The first surface of each of the combustion chamber tiles may have a plurality of particle separators, each particle separator is located at least partially upstream of the inlet of a respective one of a plurality of effusion cooling apertures.

According to a third aspect there is provided a combustion chamber tile comprising a main body having a first surface and a second surface facing in the opposite direction to the first surface, the combustion chamber tile having a peripheral wall extending around the edges of the combustion chamber tile and projecting from the first surface, the combustion chamber tile having an effusion cooling aperture extending through the main body from the first surface to the second surface, the effusion cooling aperture having an inlet in the first surface and an outlet in the second surface, the effusion cooling aperture having a diameter, the first surface having a particle separator located upstream of the inlet of the effusion cooling aperture, the particle separator projecting from the first surface, the particle separator having a distal end remote from the effusion cooling aperture and a proximal end adjacent to the effusion cooling aperture, the particle separator having a maximum height upstream of the proximal end, the particle separator increasing in height in a direction from the distal end to towards the proximal end to the maximum height.

The combustion chamber tile may be manufactured by an additive manufacturing technique using a powder material, the additive manufacturing technique comprising directing an energy beam on the powder material to consolidate the powder material to form each of the main body, the peripheral wall, the effusion cooling aperture and the particle separator. The method may comprise directing a laser beam or an electron beam on the powder material. The method may comprise powder bed laser deposition. The combustion chamber tile may comprise at least one attachment feature projecting from the first surface, the additive manufacturing technique comprising directing an energy beam on the powder material to consolidate the powder material to form each of the main body, the peripheral wall, the effusion cooling aperture, the particle separator and the at least on attachment feature by the additive manufacturing technique. The at least one attachment feature may be a stud. The main body of the combustion chamber tile may have pedestals, pins or fins, which project from the first surface of the combustion chamber tile, the additive manufacturing technique comprising directing an energy beam on the powder material to consolidate the powder material to form the pedestals, pins or fins. The powder material may be a metal powder. The metal powder may be a nickel base superalloy, a cobalt base superalloy or an iron base superalloy.

According to a fourth aspect there is provided a combustion chamber comprising a plurality of combustion chamber segments arranged circumferentially side by side to form the combustion chamber, each combustion chamber segment extending the full axial length of the combustion chamber, the combustion chamber segments being removably secured together to form the combustion chamber, each combustion chamber segment comprising an outer wall and an inner wall spaced from the outer wall, each combustion chamber segment having a peripheral wall extending around the edges of the combustion chamber segment between the outer wall and the inner wall to space the inner wall from the outer wall and to define at least one chamber, the inner wall of each combustion chamber segment having a first surface facing the outer wall of the respective combustion chamber segment and a second surface facing away from the outer wall of the combustion chamber segment and towards a combustion zone, at least one of combustion chamber segments having an effusion cooling aperture extending through the inner wall from the first surface to the second surface, the effusion cooling aperture having an inlet in the first surface and an outlet in the second surface, the effusion cooling aperture having a diameter, the first surface having a particle separator located upstream of the inlet of the effusion cooling aperture, the particle separator projecting from the first surface towards the outer wall but being spaced from the outer wall, the particle separator having a distal end remote from the effusion cooling aperture and a proximal end adjacent to the effusion cooling aperture, the particle separator having a maximum height upstream of the proximal end, the particle separator increasing in height in a direction from the distal end to towards the proximal end to the maximum height.

The first surface of at least one of the combustion chamber segments may have a plurality of particle separators, each particle separator is located at least partially upstream of the inlet of a respective one of a plurality of effusion cooling apertures. The first surface of a plurality of the combustion chamber segments may have a particle separator located at least partially upstream of the inlet of an effusion cooling apertures. The first surface of a plurality of combustion chamber segments may have a plurality of particle separators, each particle separator is located at least partially upstream of the inlet of a respective one of a plurality of effusion cooling apertures. The first surface of each of the combustion chamber segments may have a particle separator located at least partially upstream of the inlet of an effusion cooling apertures. The first surface of each of the combustion chamber segments may have a plurality of particle separators, each particle separator is located at least partially upstream of the inlet of a respective one of a plurality of effusion cooling apertures.

According to a fifth aspect there is provided a combustion chamber segment comprising an outer wall and an inner wall spaced from the outer wall, the combustion chamber segment having a peripheral wall extending around the edges of the combustion chamber segment between the outer wall and the inner wall to space the inner wall from the outer wall and to define at least one chamber, the inner wall of the combustion chamber segment having a first surface facing the outer wall of the combustion chamber segment and a second surface facing away from the outer wall of the combustion chamber segment and towards a combustion zone, the combustion chamber segment having an effusion cooling aperture extending through the inner wall from the first surface to the second surface, the effusion cooling aperture having an inlet in the first surface and an outlet in the second surface, the effusion cooling aperture having a diameter, the first surface having a particle separator located upstream of the inlet of the effusion cooling aperture, the particle separator projecting from the first surface towards the outer wall but being spaced from the outer wall, the particle separator having a distal end remote from the effusion cooling aperture and a proximal end adjacent to the effusion cooling aperture, the particle separator having a maximum height upstream of the proximal end, the particle separator increasing in height in a direction from the distal end to towards the proximal end to the maximum height.

The combustion chamber segment may be manufactured by an additive manufacturing technique using a powder material, the additive manufacturing technique comprising directing an energy beam on the powder material to consolidate the powder material to form each of the inner wall, the outer wall, the peripheral wall, the effusion cooling aperture and the particle separator. The method may comprise directing a laser beam or an electron beam on the powder material. The method may comprise powder bed laser deposition. The combustion chamber segment may have pedestals, pins or fins, which project from the first surface of the inner wall of the combustion chamber segment, the additive manufacturing technique comprising directing an energy beam on the powder material to consolidate the powder material to form the pedestals, pins or fins. The powder material may be a metal powder. The metal powder may be a nickel base superalloy, a cobalt base superalloy or an iron base superalloy.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
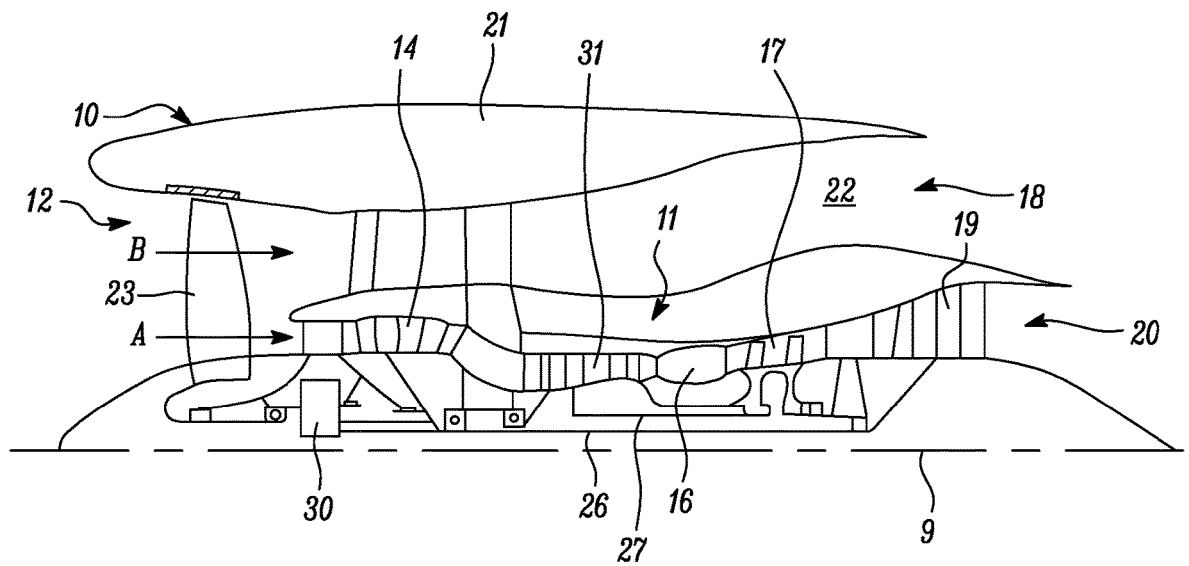
FIG. 1 is a sectional side view of a gas turbine engine.
Figure 2:
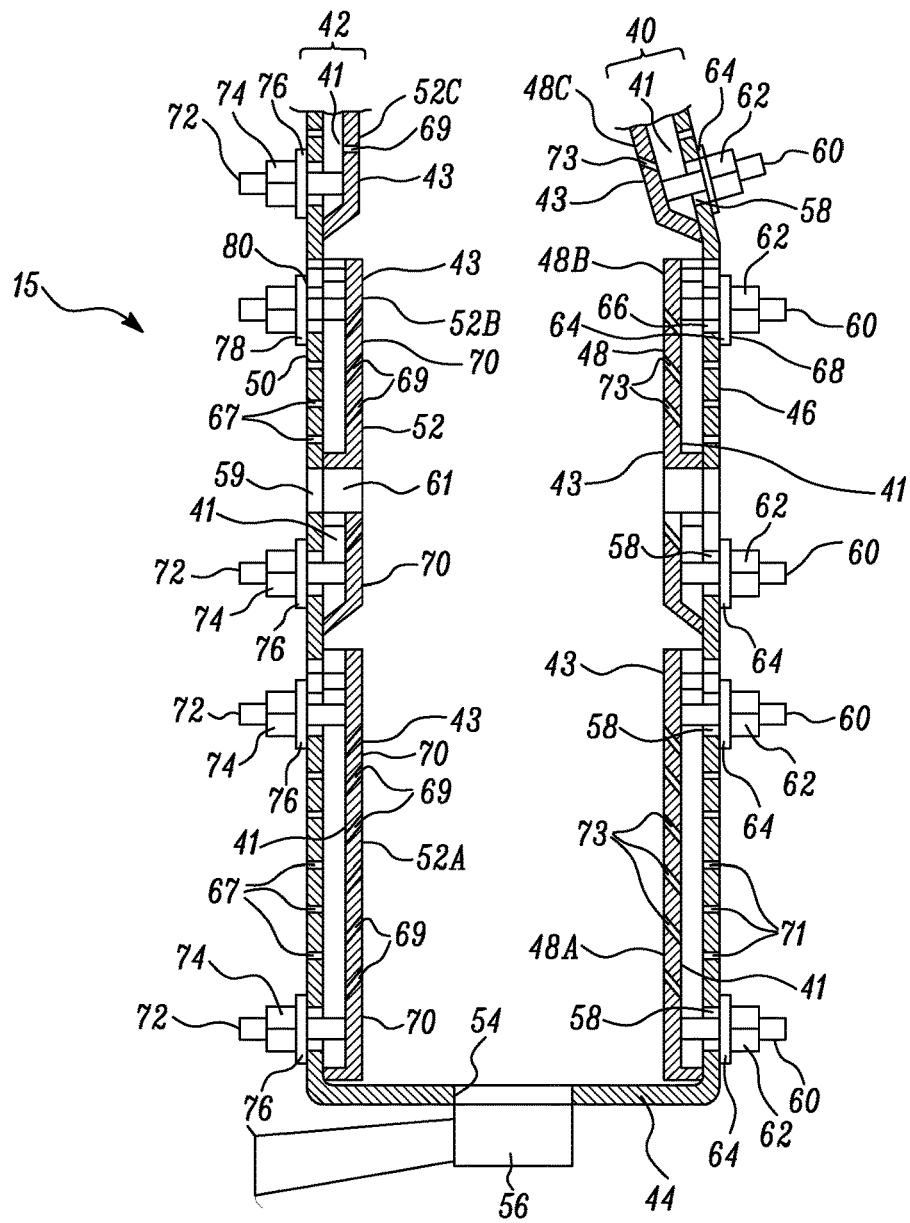
FIG. 2 is an enlarged cross-sectional view of a combustion chamber arrangement according to the present disclosure.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 31, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 31 where further compression takes place. The compressed air exhausted from the high pressure compressor 31 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 31 by a suitable interconnecting shaft 27. The fan 23 generally provides the majority of the propulsive thrust. The epicyclic gearbox 30 is a reduction gearbox.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Combustion equipment 16 according to the present disclosure, as shown more clearly in FIGS. 2, 3, 4 and 5, comprises an annular combustion chamber 15 arrangement and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54 and each aperture 54 has a respective one of a plurality of fuel injectors 56 located therein. The fuel injectors 56 are arranged to supply fuel into the annular combustion chamber 15 during operation of the gas turbine engine 10.

The first annular wall 46 has a plurality of mounting apertures 58 extending there-though and the second annular wall 48 has a plurality of attachment features 60 extending radially there-from. Each attachment feature 60 on the second annular wall 48 extends radially through a corresponding mounting aperture 58 in the first annular wall 46. A cooperating fastener 62 locates on each of the attachment features 60 extending through the mounting apertures 58 in the first annular wall 46. A washer 64 is positioned between each attachment feature 60 on the second annular wall 48 and the cooperating fastener 62. Each washer 64 has a first surface 66 abutting an outer surface of the first annular wall 46 and a second surface 68 abutting a surface of the cooperating fastener 62. The second annular wall 48 comprises a plurality of tiles 48A, 48B and 48C and the tiles 48A, 48B and 48C are arranged circumferentially and axially around the first annular wall 46. The axially extending edges of adjacent tiles 48A, 48B and/or 48B may abut each other or may overlap each other and the circumferentially extending ends of adjacent tiles 48A, 48B and 48C are spaced from each other.

Similarly, the third annular wall 50 has a plurality of mounting apertures 70 extending there-though and the fourth annular wall 52 has a plurality of attachment features 72 extending radially there-from. Each attachment feature 72 on the fourth annular wall 52 extends radially through a corresponding mounting aperture 70 in the third annular wall 50. A cooperating fastener 74 locates on each of the attachment features 72 extending through the mounting apertures 70 in the third annular wall 50. A washer 76 is positioned between each attachment feature 72 on the fourth annular wall 52 and the cooperating fastener 74. Each washer 76 has a first surface 78 abutting an outer surface of the third annular wall 50 and a second surface 80 abutting a surface of the cooperating fastener 74. The fourth annular wall 52 comprises a plurality of tiles 52A, 52B and 52C and the tiles 52A, 52B and 52C are arranged circumferentially and axially adjacent to each other to define the fourth annular wall 52. The axially extending edges of adjacent tiles 52A, 52B and/or 52C may abut each other or may overlap each other and the circumferentially extending ends of adjacent tiles 52A, 52B and 52C are spaced from each other.

The attachment features 60 and 72 on the second and fourth annular walls 48 and 52 are threaded studs which are cast integrally with the tiles 48A, 48B, 48C, 52A 52B and 52C or may be secured to the tiles 48A, 48B, 48C, 52A, 52B and 52C by welding, brazing etc. Alternatively, the fasteners, e.g. threaded studs are formed by additive layer manufacturing integrally with the tiles 48A, 48B, 48C, 52A 52B and 52C. The cooperating fasteners 62 and 74 are nuts.

The first and third annular walls 46 and 50 form outer walls of the annular combustion chamber 15 and the second and fourth annular walls 48 and 52 form inner walls of the annular combustion chamber 15. The second and fourth annular walls 48 and 52 are each a wall at least partially defining a combustion zone. The second annular wall 48 comprises at least one row of circumferentially arranged tiles and in this example there are three rows 48A, 48B and 48C of circumferentially arranged tiles and the tiles 48A form an axially upstream row of circumferentially arranged tiles, the tiles 48B form an axially intermediate row of circumferentially arranged tiles and the tiles 48C form an axially downstream row of circumferentially arranged tiles. Each of the tiles of the second annular wall 48 is a wall at least partially defining the combustion zone. Similarly, the fourth annular wall 52 comprises at least one row of circumferentially arranged tiles and in this example there are three rows 52A, 52B and 52C of circumferentially arranged tiles and the tiles 52A form an axially upstream row of circumferentially arranged tiles, the tiles 52B form an axially intermediate row of circumferentially arranged tiles and the tiles 52C form an axially downstream row of circumferentially arranged tiles. Each of the tiles of the fourth annular wall 52 is a wall at least partially defining the combustion zone.

The combustion chamber arrangement also comprises a plurality of dilution ports in the radially inner annular wall structure 40 and a plurality of dilution ports in the radially outer annular wall structure 42. The dilution ports in the radially outer annular wall structure 42 comprises a plurality of aligned apertures 59 and 61 in the annular outer wall 50 and the tiles 52B of the annular inner wall 52. The dilution ports in the radially inner annular wall structure 40 comprise a plurality of aligned apertures in the annular outer wall 46 and the tiles 48B of the annular inner wall 48. The dilution ports supply dilution air into the combustion chamber to control emissions.

Figure 3:
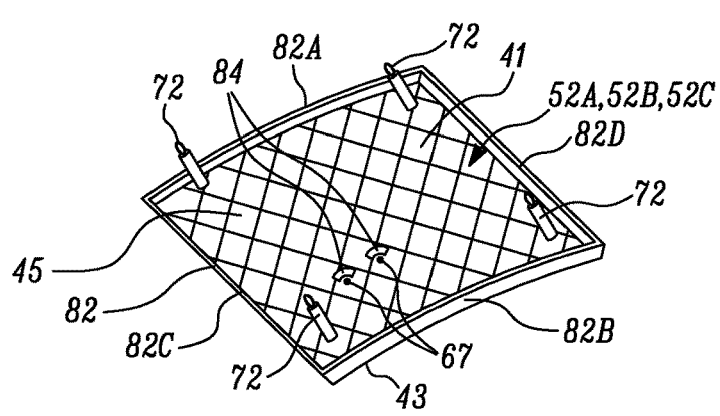
FIG. 3 is a further enlarged perspective view of a combustion chamber tile of the combustion chamber arrangement shown in FIG. 2.

Each of the combustion chamber tiles 48A, 48B, 48C, 52A, 52B and 52C comprises a main body 45 which has a first surface 41 and a second surface 43, as shown in FIG. 3. The first surface 41 of each combustion chamber tile 48A, 48B, 48C, 52A, 52B and 52C is an outer surface facing the respective outer annular wall 46 and 50 and the second surface 43 of each combustion chamber tile 48A, 48B, 48C, 52A, 52B and 52C is an inner surface facing away from the respective outer annular wall 46 and 50 and towards the combustion zone within the combustion chamber 15.

The annular outer wall 50 has a plurality of impingement cooling apertures 67 extending there-through to direct coolant, e.g. air, onto the outer surface, e.g. the first surface, 41 of the tiles 52A, 52B and 52C and the tiles 52A, 52B and 52C have effusion cooling apertures 69 extending there-through to provide a film of coolant onto the inner surfaces of the tiles 52A, 52B and 52C respectively. The impingement cooling apertures 67 are generally arranged perpendicularly to the surfaces of the annular outer all 50 and the outer surfaces of the tiles 52A, 52B and 52C respectively. The effusion cooling apertures 69 are generally arranged at an acute angle, for example 30°, to the inner surfaces of the tiles 52A, 52B and 52C but other suitable angles may be used. Some effusion cooling apertures 69 may be arranged perpendicularly to the inner surfaces of the tiles 52A, 52B and 52C and some of the effusion cooling apertures 69 may be arranged at an acute angle, for example 30°, to the inner surfaces of the tiles 52A, 52B and 52C. The impingement cooling apertures 67 are generally arranged in rows in which the impingement cooling apertures 67 are circumferentially spaced and the impingement cooling apertures 67 in axially adjacent rows are circumferentially staggered.

The annular outer wall 46 has a plurality of impingement cooling apertures 71 extending there-through to direct coolant, e.g. air, onto the outer surface, e.g. the first surface, 41 of the tiles 48A, 48B and 48C and the tiles 48A, 48B and 48C have effusion cooling apertures 73 extending there-through to provide a film of coolant onto the inner surfaces of the tiles 48A, 48B and 48C respectively. The impingement cooling apertures 71 are generally arranged perpendicularly to the surfaces of the annular outer all 46 and the outer surfaces of the tiles 48A, 48B and 48C respectively. The effusion cooling apertures 73 are generally arranged at an acute angle, for example 30°, to the inner surfaces of the tiles 48A, 48B and 48C but other suitable angles may be used. Some effusion cooling apertures 73 may be arranged perpendicularly to the inner surfaces of the tiles 48A, 48B and 48C and some of the effusion cooling apertures 73 may be arranged at an acute angle, for example 30°, to the inner surfaces of the tiles 48A, 48B and 48C. The impingement cooling apertures 71 are generally arranged in rows in which the impingement cooling apertures 71 are circumferentially spaced and the impingement cooling apertures 71 in axially adjacent rows are circumferentially staggered.

The effusion cooling apertures 69, 73 extend through the combustion chamber tiles 48A, 48B, 48C, 52A, 52B and 52C from the first surface 41 to the second surface 43. Each effusion cooling aperture 69, 73 has an inlet in the first surface 41 and an outlet in the second surface 43. The effusion cooling apertures 69, 73 are arranged in axially spaced rows and the effusion cooling apertures 69, 73 in each row are circumferentially spaced apart. The effusion cooling apertures 69, 73 in each row are offset circumferentially from the effusion cooling apertures 69, 73 in each adjacent row. The effusion cooling apertures 69, 73 are arranged at an acute angle to the second surface 43 of the combustion chamber tiles 48A, 48B, 48C, 52A, 52B, 52C. The effusion cooling apertures 69, 73 may be arranged at an angle of 20° to 90° to the second surface 43 of the combustion chamber tiles 48A, 48B, 48C, 52A, 52B, 52C. The effusion cooling apertures 69, 73 are arranged for example at an angle of 20° to 30° to the second surface 43 of the combustion chamber tiles 48A, 48B, 48C, 52A, 52B, 52C.

Each combustion chamber tile 48A, 48B, 48C, 52A, 52B, 52C is shown more clearly in FIG. 3, and comprises a peripheral wall, or rail, 82 which extends around the periphery of the tile 48A, 48B, 48C, 52A, 52B, 52C and extends from the first surface 41 of the tile 48A, 48B, 48C, 52A, 52B, 52C towards the first annular wall 46 or third annular wall 50 respectively. The peripheral wall, or rail, 82 spaces the tile 48A, 48B, 48C, 52A, 52B, 52C from the first annular wall 46 or third annular wall 50 respectively and forms a chamber between the tile 48A, 48B, 48C, 52A, 52B, 52C and the first annular wall 46 or third annular wall 50 respectively. The peripheral wall, or rail, 82 comprises axially spaced circumferentially extending wall portions 82A and 82B and circumferentially spaced axially extending wall portions 82C and 82D which extend between and are secured to the wall portions 82A and 82B. The peripheral wall, or rail, 82 extends around the edges of the tile 48A, 48B, 48C, 52A, 52B, 52C and projects from the first surface 41 of the main body 45. The attachment features 60, 72 project from the first surface 41 of the main body 45.

Figure 4:
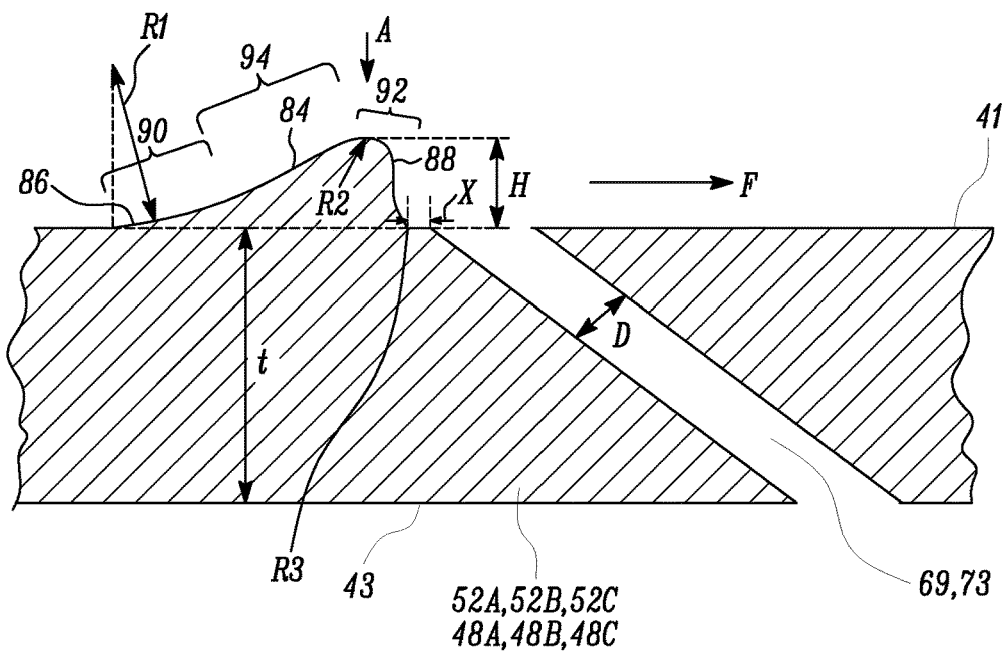
FIG. 4 is a further enlarged cross-sectional view of a combustion chamber tile of the combustion chamber arrangement shown in FIG. 2.
Figure 5:
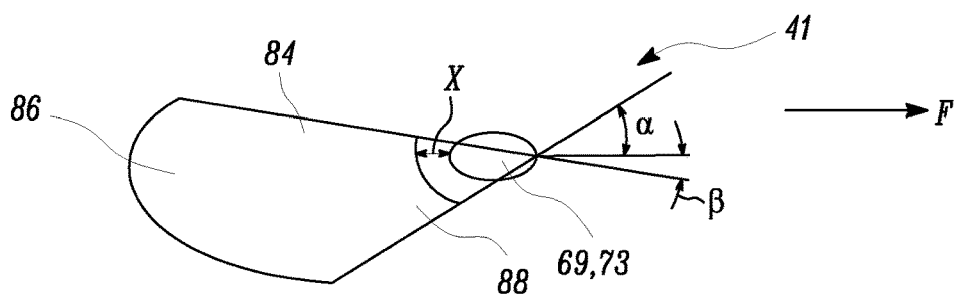
FIG. 5 is a plan view of the combustion chamber tile in the direction of arrow A in FIG. 4.

The first surface 41 of at least one of the tiles 48A, 48B, 48C, 52A, 52B, 52C has at least one particle separator 84 at least partially located upstream of the inlet of an effusion cooling aperture 69, 73, as shown in FIGS. 4 and 5. In this example the first surface 41 of each of the tiles 48A, 48B, 48C, 52A, 52B, 52C has a plurality of particle separators 84, each particle separator 84 is located at least partially upstream of the inlet of a respective one of a plurality of effusion cooling apertures 69, 73. However, in another example the first surface 41 of at least one of the tiles 48A, 48B, 48C, 52A, 52B, 52C has a plurality of particle separators 84, each particle separator 84 is located at least partially upstream of the inlet of a respective one of a plurality of effusion cooling apertures 69, 73. In a further example the first surface 41 of a plurality of the tiles 48A, 48B, 48C, 52A, 52B, 52C has at least one particle separator 84 located at least partially upstream of the inlet of an effusion cooling apertures 69, 73. In an additional example the first surface 41 of a plurality of the tiles 48A, 48B, 48C, 52A, 52B, 52C has a plurality of particle separators 84, each particle separator 84 is located at least partially upstream of the inlet of a respective one of a plurality of effusion cooling apertures 69, 73. In a further example the first surface 41 of each of the tiles 48A, 48B, 48C, 52A, 52B, 52C has a particle separator 84 located at least partially upstream of the inlet of an effusion cooling apertures 69, 73.

The, or each, particle separator 84 projects away from the first surface 41 and away from the combustion zone. The, or each, particle separator 84 has a distal end 86 remote from the inlet of the effusion cooling aperture 69, 73 and a proximal end 88 adjacent to the inlet of the effusion cooling aperture 69, 73. The, or each, particle separator 84 has a maximum height H above the first surface 41 at a location spaced from the proximal end 88. The, or each, particle separator 84 increases in height in a direction from the distal end 86 towards the proximal end 88 to the maximum height H. The particle separator 84 is generally triangular in cross-section. The, or each, particle separator 84 has a first portion 90 adjacent the distal end 86, a second portion 92 adjacent the proximal end 88 and a third portion 94 between the first portion 90 and the second portion 92. The third portion 94 increases in height at a constant rate between the first portion 90 and the maximum height H. The maximum height H is at the junction between the third portion 94 and the second portion 92. The first portion 90 has a curved surface from the first surface 41 of the tile 48A, 48B, 48C, 52A, 52B, 52C to the third portion 94. Each particle separator 84 is designed to produce a flow of coolant, air, and any particles of sand, dust, grit or volcanic ash etc. such that the coolant may turn and flow into the respective inlet of the effusion cooling aperture 69, 73 and then through the associated effusion cooling aperture 69, 73 and yet the particles of sand, dust, grit or volcanic ash etc. are centrifuged away from the inlet of the associated effusion cooling aperture 69, 73. Each particle separator 84 is designed to minimise separation of the coolant flow from the surface of the particle separator 84.

The curved surface of the first portion 90 of the, or each, particle separator 84 comprises an arc of a circle. The arc of the circle has a radius R1 of four to twelve times the diameter D of the effusion cooling aperture 69, 73. The arc of the circle may have a radius R1 of 2 mm to 6 mm. The second portion 92 comprises a first curved surface, a second curved surface and a linear surface between the first curved surface and the second curved surface. The first curved surface, the linear surface and the second curved surface are arranged in series between the junction with the third portion 94 and the first surface 41 of the tile 48A, 48B, 48C, 52A, 52B or 52C. The linear surface is arranged perpendicularly to the first surface 41. Alternatively, the second portion 92 of the, or each, particle separator 84 may simply comprise a linear surface between the junction with the third portion 94 and the first surface 41 of the tile 48A, 48B, 48C, 52A, 52B or 52C. The linear surface may be arranged at other angles relative to the first surface 41 of the tile 48A, 48B, 48C, 52A, 52B or 52C. The linear surface may be arranged at an acute angle relative to the first surface 41 of the tile 48A, 48B, 48C, 52A, 52B or 52C such that the particle separator 84 overhangs the effusion cooling aperture 69, 73. The first curved surface of the second portion 92 comprises an arc of a circle. The arc of the circle has a radius R2 of one tenth of the diameter D of the effusion cooling aperture 69, 73. The second curved surface may be an arc of a circle. The arc of the circle has a radius R3 of three tenths to twelve tenths of the diameter D of the effusion cooling aperture 69, 73. The arc of the circle has a radius R3 of 0.15 mm to 0.6 mm. The smaller the radius R3 the smaller is the distance x between the proximal end 88 of the particle separator 84 and the inlet of the effusion cooling aperture 69, 73 to increase the effectiveness of the particle separator 84. However, the smaller the radius R3 the greater is the change in thickness t of the tile 48A, 48B, 48C, 52A, 52B or 52C and hence the greater the chance of crack initiation and hence reduction in working life of the tile 48A, 48B, 48C, 52A, 52B or 52C. Therefore R3 is selected as a compromise between effectiveness and the working life of the tile 48A, 48B, 48C, 52A, 52B or 52C. The third portion 94 of the, or each, particle separator 84 comprises a linear surface. The maximum height H of the particle separator 84 is equal to or greater than the diameter D of the effusion cooling aperture 69, 73. The effusion cooling aperture 69, 73 have a diameter D of 0.3 to 1.0 mm. The third portion 94 may be arranged at an angle of 25° to 50° to the first surface 41.

In one example the, or each, effusion cooling aperture 69, 73 has a diameter D of 0.5 mm. The arc of the circle has a radius R1 of 2 mm to 6 mm. The arc of the circle R2 has a radius of 0.5 mm. The arc of the circle has a radius R3 of 0.05 mm. The particle separator has a height H of 0.5 mm. The third portion 94 is arranged at an angle of 30° to the first surface 41. The particle separators 84 are placed upstream of the inlets of the effusion cooling apertures 69, 73 such that the coolant, air, flow streamlines at the entry to the effusion cooling apertures 69, 73 are curved so as to centrifuge the particles away from the inlets of the effusion cooling apertures 69, 73. The particle separators 84 are tuned to generate streamlines of appropriate curvature to effectively separate particles above a certain size and density. This curvature would be tuned to ensure that only particles sufficiently small may pass through the effusion cooling aperture 69, 73 without blocking it. For example, for a cooling hole of nominal diameter D=0.5 mm the particle separator 84 centrifuges particles in the size range 0.6 mm to 0.2 mm away from the effusion cooling aperture 69, 73. Larger particles are not able to enter the effusion cooling apertures 69, 73 and smaller particles are able to pass through the effusion cooling apertures 69, 73.

In FIGS. 4 and 5 the particle separator 84 has an arcuate distal end 86 and an arcuate proximal end 88 curving around an upstream end of the inlet of the effusion cooling aperture 69, 73 in the direction of airflow F. The particle separator 84 may have a part annular base defined, in part, by angles α and β. The first portion 90 of a particle separator 84 with a part annular base has a curved surface from the first surface 41 of the tile 48A, 48B, 48C, 52A, 52B or 52C to the third portion 94 and the third portion 94 has a frusto-conical surface. The second portion 92 of the particle separator 84 with a part annular base has a part cylindrical linear surface.

Figure 6:
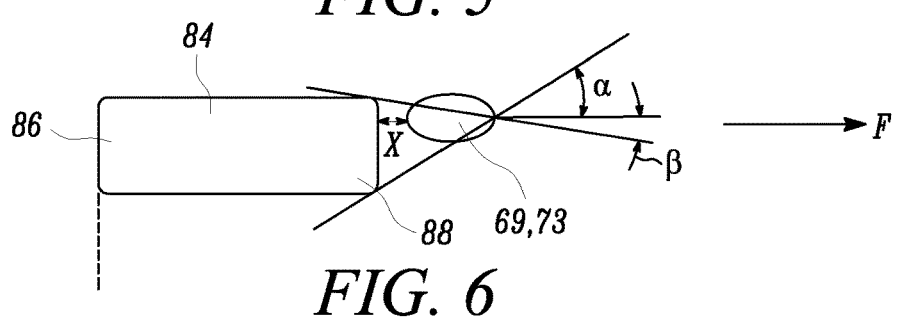
FIG. 6 is an alternative plan view of the combustion chamber tile in the direction of arrow A in FIG. 4.

FIG. 6 shows an alternative particle separator 84 at least partially located upstream of the inlet of an effusion cooling aperture 69, 73. The, or each, particle separator 84 projects away from the first surface 41 and away from the combustion zone. The, or each, particle separator 84 has a distal end 86 remote from the inlet of the effusion cooling aperture 69, 73 and a proximal end 88 adjacent to the inlet of the effusion cooling aperture 69, 73 and is substantially the same and has substantially the same cross-sectional shape as shown in FIG. 4. The particle separator 84 shown in FIG. 6 differs in that the particle separator 84 has a substantially rectangular base defined, in part, by angles α and β. The particle separator 84 in FIG. 6 is substantially wedge shaped. The first portion 90 of a particle separator 84 with a rectangular base has a curved surface from the first surface 41 of the tile 48A, 48B, 48C, 52A, 52B or 52C to the third portion 94 and the third portion 94 has a planar surface. The second portion 92 of the particle separator 84 with a part rectangular base has a planar linear surface. The particle separator 84 has a lateral dimension greater than the diameter D of the effusion cooling aperture 69, 73. The lateral dimension of the particle separator 84 may be up to three times the diameter D of the effusion cooling aperture 69, 73. The particle separator 84 may be arranged such that the middle of the particle separator 84 is aligned with the centre of the effusion cooling aperture 69, 73. The particle separator 84 in this example is arranged such that the middle of the particle separator 84 is aligned with an edge of the effusion cooling aperture 69, 73.

Figure 7:
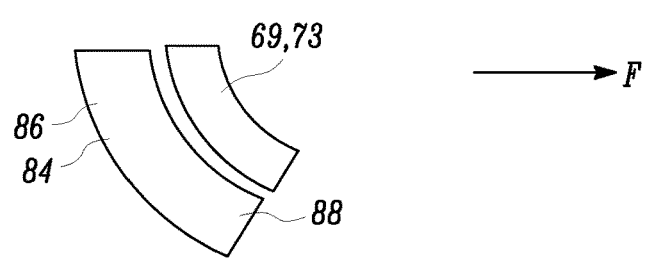
FIG. 7 is another alternative plan view of the combustion chamber tile in the direction of arrow A in FIG. 4.

FIG. 7 shows an alternative particle separator 84 at least partially located upstream of the inlet of an effusion cooling aperture 69, 73. The, or each, particle separator 84 projects away from the first surface 41 and away from the combustion zone. The, or each, particle separator 84 has a distal end 86 remote from the inlet of the effusion cooling aperture 69, 73 and a proximal end 88 adjacent to the inlet of the effusion cooling aperture 69, 73 and is substantially the same and has substantially the same cross-sectional shape as shown in FIG. 4. The effusion cooling aperture 69, 73 and the particle separator 84 shown in FIG. 7 differ in that the effusion cooling aperture 69, 73 has a slotted inlet comprising a concave upstream end wall/surface, a convex downstream end wall/surface and concave side walls/surfaces and one concave side wall/surface is displaced in a downstream direction from the other concave side wall/surface. The particle separator 84 is shaped to match the concave upstream end wall/surface.

Figure 8:
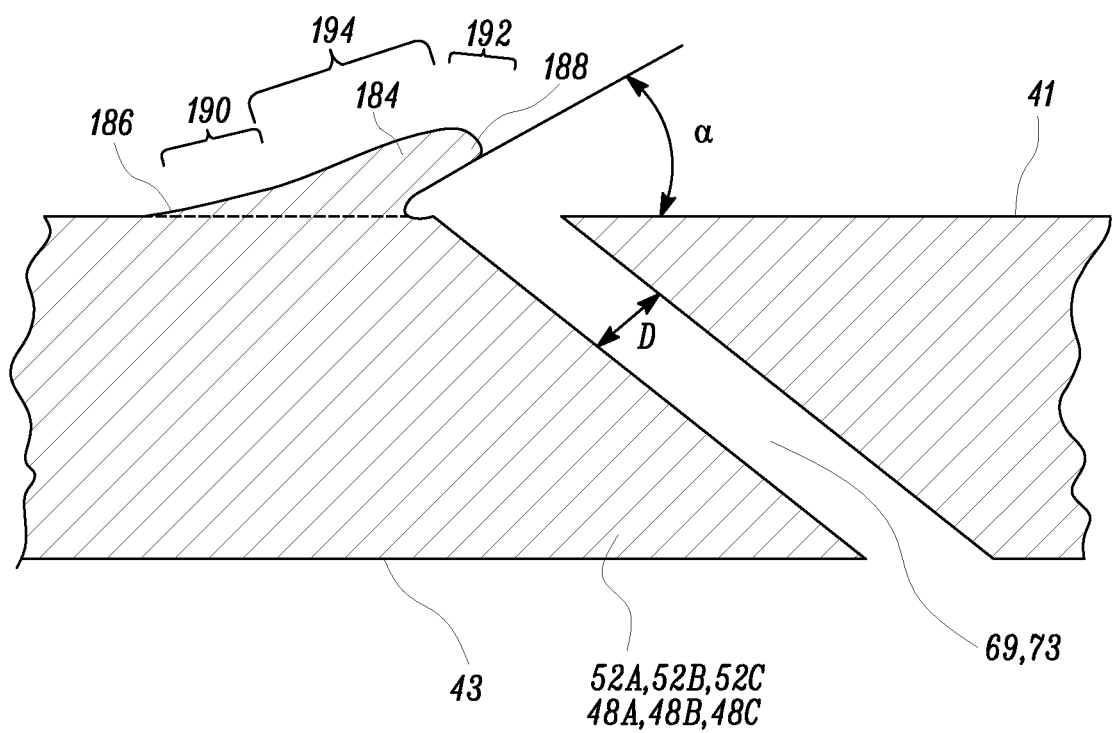
FIG. 8 is another further enlarged cross-sectional view of a combustion chamber tile of the combustion chamber arrangement shown in FIG. 2.

FIG. 8 shows an alternative particle separator 184 at least partially located upstream of the inlet of an effusion cooling aperture 69, 73. The, or each, particle separator 184 projects away from the first surface 41 and away from the combustion zone. The, or each, particle separator 184 has a distal end 186 remote from the inlet of the effusion cooling aperture 69, 73 and a proximal end 188 adjacent to the inlet of the effusion cooling aperture 69, 73. The, or each, particle separator 184 overhangs the inlet of the effusion cooling aperture 69, 73. The, or each, particle separator 184 has a first portion 190 adjacent the distal end 186, a second portion 192 adjacent the proximal end 188 and a third portion 194 between the first portion 190 and the second portion 192. The linear surface of the second portion 192 may be arranged at an angle of 30° to 80° to the first surface 41 of the tile 48A, 48B, 48C, 52A, 52B or 52C. The linear surface may be arranged at an angle of 40° to 75° to the first surface 41 of the tile 48A, 48B, 48C, 52A, 52B or 52C.

The main body and the peripheral wall of each combustion chamber tile may comprise a monolithic structure consisting of consolidated powder material, e.g. consolidated powder metal. The main body, the peripheral wall, the attachment feature and the at least one particle separator of each combustion chamber tile may comprise a monolithic structure consisting of consolidated powder material, e.g. consolidate powder metal. The, or each, combustion chamber tile may be manufactured by an additive manufacturing technique using a powder material, the additive manufacturing technique comprising directing an energy beam on the powder material to consolidate the powder material to form each of the main body, the peripheral wall, the effusion cooling aperture and the particle separator by the additive manufacturing technique. The method may comprise directing a laser beam or an electron beam on the powder material. The method may comprise powder bed laser deposition. The main body of the combustion chamber tile may have pedestals, pins or fins, which project from the first surface of the combustion chamber tile, the additive manufacturing technique comprising directing an energy beam on the powder material to consolidate the powder material to form the pedestals, pins or fins. The powder material may be a metal powder. The metal powder may be a nickel base superalloy, a cobalt base superalloy or an iron base superalloy. The main body and the peripheral wall of each combustion chamber tile may comprise a monolithic structure consisting of a cast material, e.g. a cast metal. The main body, the peripheral wall, the attachment feature and the at least one particle separator of each combustion chamber tile may comprise a monolithic structure consisting of a cast material, e.g. cast metal. The main body of the combustion chamber tile may have pedestals, pins or fins, which project from the first surface of the combustion chamber tile.

Figure 9:
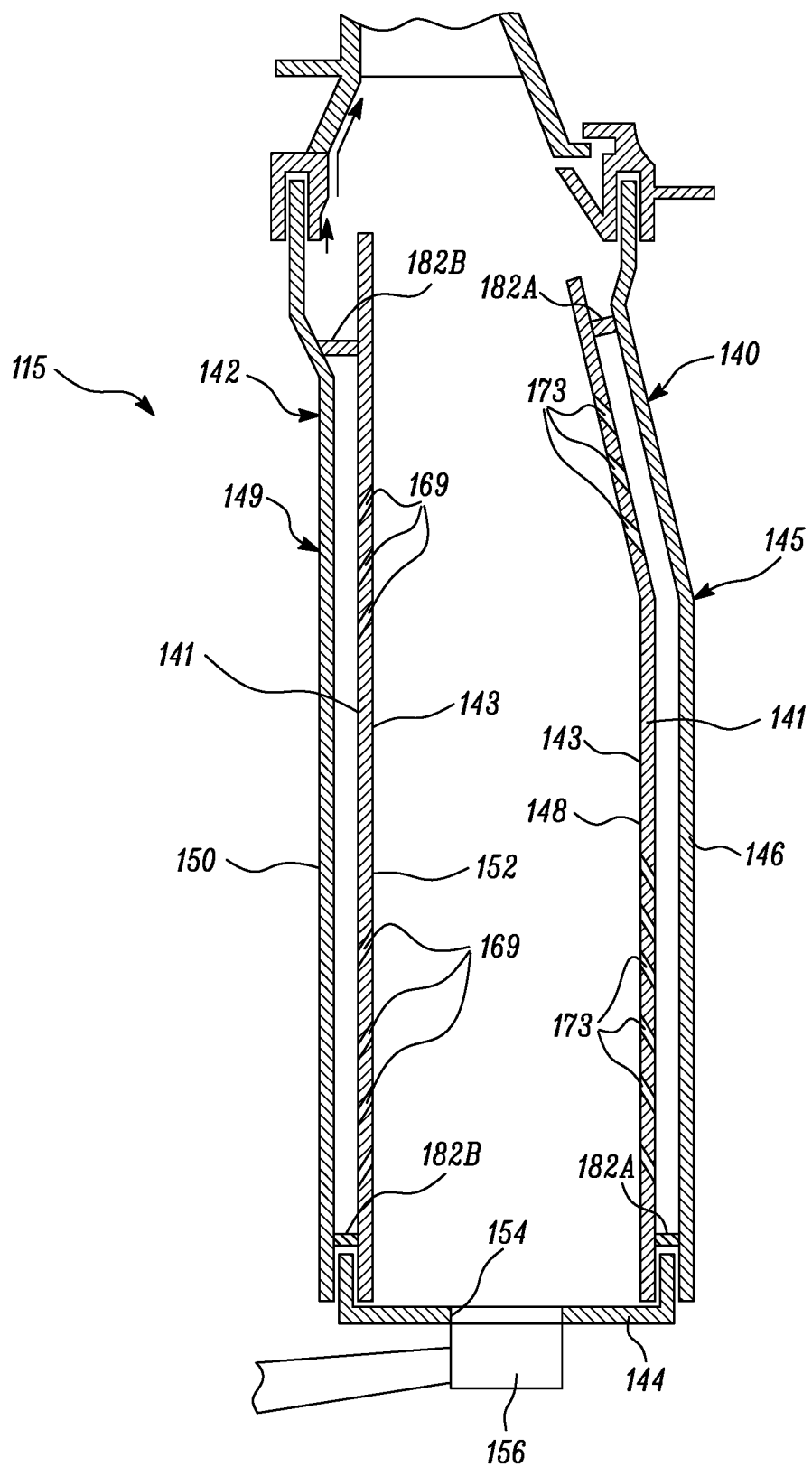
FIG. 9 is an enlarged cross-sectional view of an alternative combustion chamber arrangement according to the present disclosure.
Figure 10:
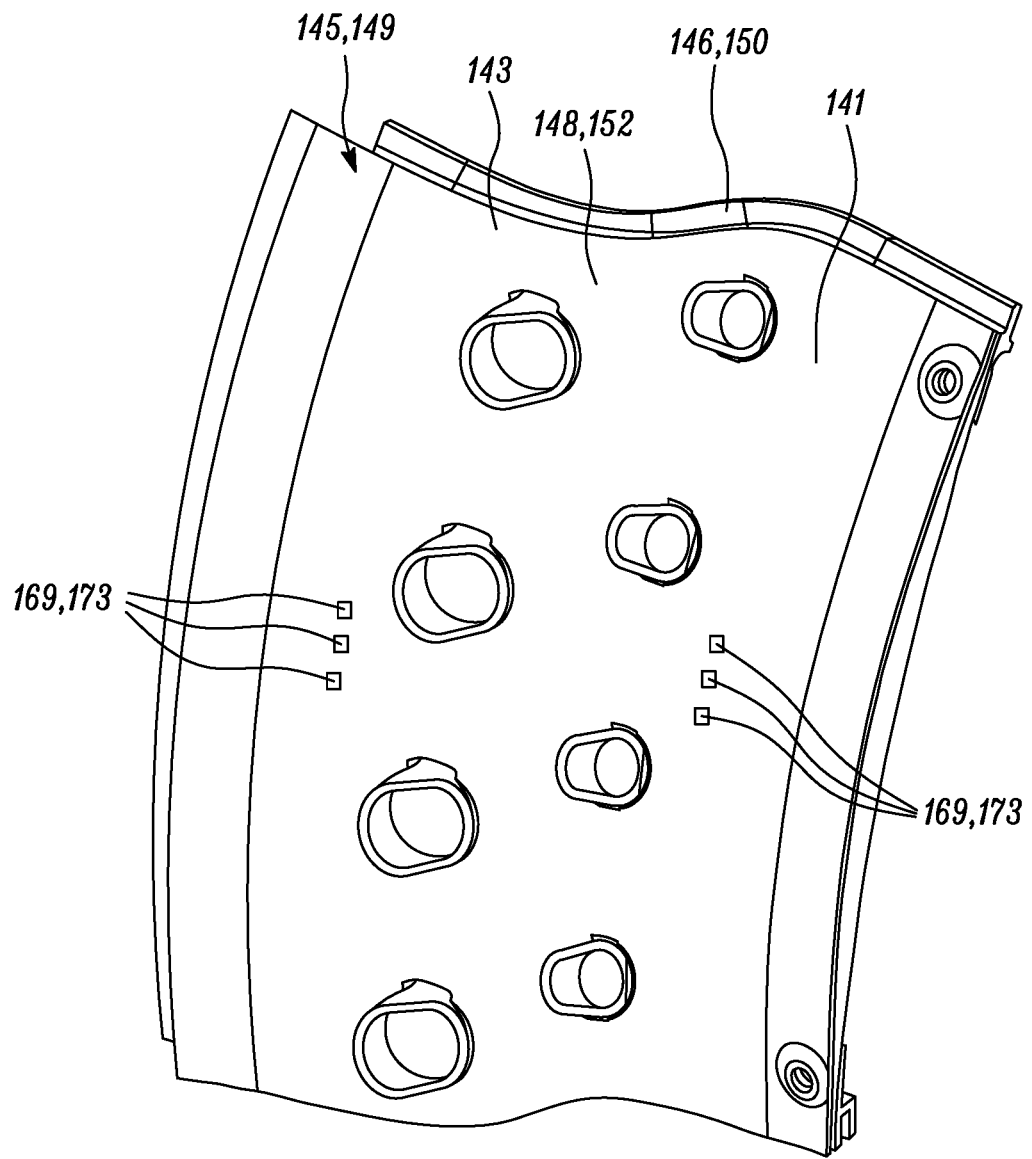
FIG. 10 is a further enlarged perspective view of a combustion chamber segment of the combustion chamber arrangement shown in FIG. 9.

Further combustion equipment 115 according to the present disclosure, as shown more clearly in FIGS. 9 and 10, comprises an annular combustion chamber arrangement and comprises a radially inner annular wall structure 140, a radially outer annular wall structure 142 and an upstream end wall structure 144. The radially outer annular wall structure 142 comprises a plurality of combustion chamber segments 149 arranged circumferentially side by side to form the combustion chamber 115. Each combustion chamber segment 149 extends the full axial length of the combustion chamber 115. The combustion chamber segments 149 are removably secured together to form the combustion chamber 115. Each combustion chamber segment 149 comprises an outer wall 150 and an inner wall 152 spaced from the outer wall 150 and each combustion chamber segment 149 has a peripheral wall 182B extending around the edges of the combustion chamber segment 149 between the outer wall 150 and the inner wall 152 to space the inner wall 152 from the outer wall 150 and to define at least one chamber. The inner wall 152 of each combustion chamber segment 149 has a first surface 141 facing the outer wall 150 of the respective combustion chamber segment 149 and a second surface 143 facing away from the outer wall 150 of the combustion chamber segment 149 and towards a combustion zone. The radially inner annular wall structure 140 comprises a plurality of combustion chamber segments 145 arranged circumferentially side by side to form the combustion chamber 115. Each combustion chamber segment 145 extends the full axial length of the combustion chamber 115. The combustion chamber segments 145 are removably secured together to form the combustion chamber 115. Each combustion chamber segment 145 comprises an outer wall 146 and an inner wall 148 spaced from the outer wall 146 and each combustion chamber segment 145 has a peripheral wall 182A extending around the edges of the combustion chamber segment 145 between the outer wall 146 and the inner wall 148 to space the inner wall 148 from the outer wall 146 and to define at least one chamber. The inner wall 148 of each combustion chamber segment 145 has a first surface 141 facing the outer wall 146 of the respective combustion chamber segment 145 and a second surface 141 facing away from the outer wall 146 of the combustion chamber segment 145 and towards a combustion zone. The upstream ends of the combustion chamber segments 145 of the radially inner annular wall structure 140 are secured to the upstream end wall structure 144 and the upstream ends of the combustion chamber segments of the radially outer annular wall structure 142 are secured to the upstream end wall structure 144. The upstream end wall structure 144 has a plurality of circumferentially spaced apertures 154 and each aperture 154 has a respective one of a plurality of fuel injectors 156 located therein. The fuel injectors 156 are arranged to supply fuel into the annular combustion chamber 115 during operation of the gas turbine engine 10.

The inner wall 148 of each combustion chamber segment 145 has a plurality of effusion cooling apertures 173 extending there-through to provide a film of coolant onto the inner surface 143 of the inner wall 148 of the combustion chamber segments 145. Similarly, the inner wall 152 of each combustion chamber segment 149 has a plurality of effusion cooling apertures 169 extending there-through to provide a film of coolant onto the inner surface 143 of the inner wall 152 of the combustion chamber segments 149.

The combustion chamber segment is manufactured by an additive manufacturing technique using a powder material, the additive manufacturing technique comprising directing an energy beam on the powder material to consolidate the powder material to form each of the inner wall, the outer wall, the peripheral wall, the effusion cooling aperture and the particle separator by the additive manufacturing technique. The method may comprise directing a laser beam or an electron beam on the powder material. The method may comprise powder bed laser deposition. The combustion chamber segment may have pedestals, pins or fins, which project from the first surface of the inner wall of the combustion chamber segment, the additive manufacturing technique comprising directing an energy beam on the powder material to consolidate the powder material to form the pedestals, pins or fins. The powder material may be a metal powder. The metal powder may be a nickel base superalloy, a cobalt base superalloy or an iron base superalloy.

The inner wall 148 has at least one particle separator positioned upstream of an effusion cooling aperture 173 and/or the inner wall 150 has at least one particle separator positioned upstream of an effusion cooling aperture 169. The inner wall 146 may have a plurality of particle separators, each particle separator is positioned upstream of one of the effusion cooling apertures 173 and/or the inner wall 152 has a plurality of particle separators, each particle separator is positioned upstream of one of the effusion cooling apertures 169. The particle separators may be as shown and described with reference to FIGS. 4 and 5, FIGS. 4 and 6, FIGS. 4 and 7 or FIGS. 4 and 8.

Figure 11:
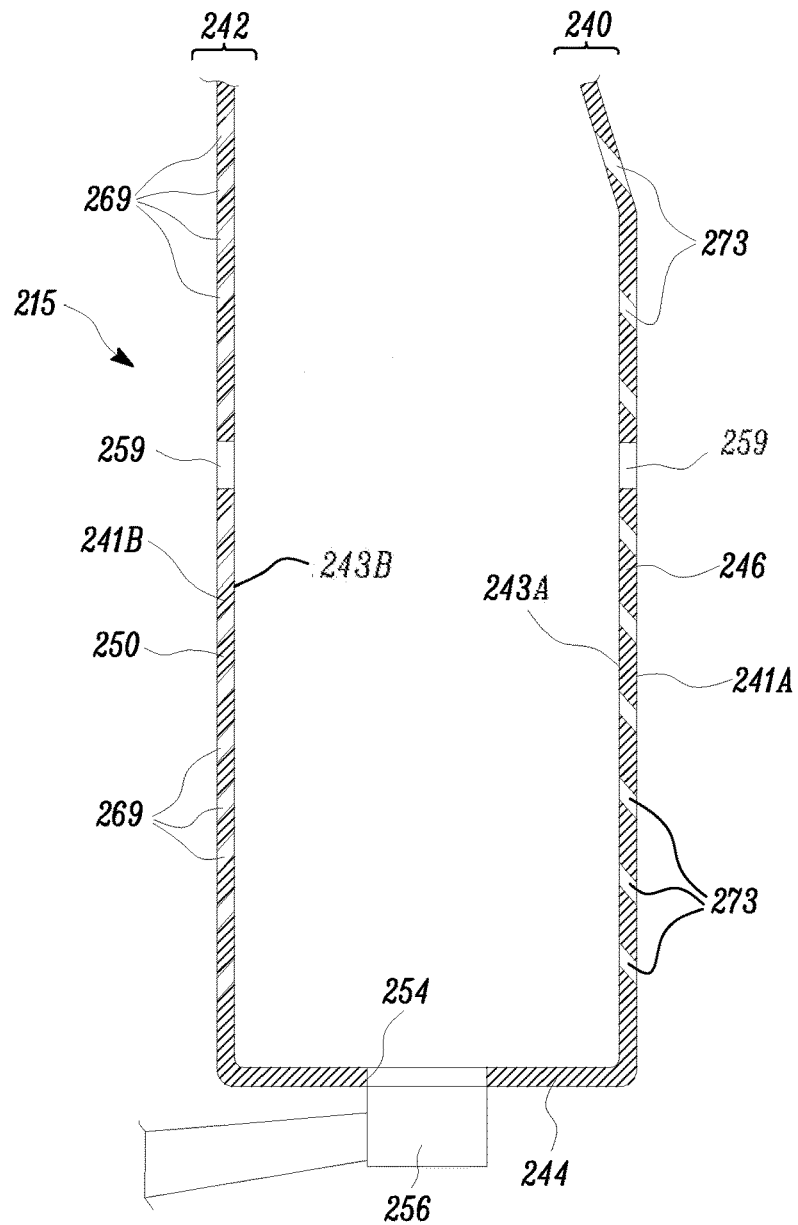
FIG. 11 is an enlarged cross-sectional view of a further combustion chamber arrangement according to the present disclosure.

Further combustion equipment 215 according to the present disclosure, as shown more clearly in FIG. 11, comprises an annular combustion chamber arrangement and comprises a radially inner annular wall structure 240, a radially outer annular wall structure 242 and an upstream end wall structure 244. The radially inner annular wall structure 240 simply comprises a first annular wall 246. The radially outer annular wall structure 242 simply comprises a second annular wall 250. The dilution ports 259 are provided in the radially outer annular wall structure 242 and radially inner annular wall structure 240. The upstream end of the first annular wall 246 is secured to the upstream end wall structure 244 and the upstream end of the second annular wall 250 is secured to the upstream end wall structure 244. The upstream end wall structure 244 has a plurality of circumferentially spaced apertures 254 and each aperture 254 has a respective one of a plurality of fuel injectors 256 located therein. The fuel injectors 256 are arranged to supply fuel into the annular combustion chamber 215 during operation of the gas turbine engine 10.

The first annular wall 246 has a first surface 241A facing away from the combustion zone and a second surface 243A facing the combustion zone. The first annular wall 246 has a plurality of effusion cooling apertures 273 extending there-through from the first surface 241A to the second surface 243A to provide a film of coolant onto the inner surface of the first annular wall 246. The effusion cooling aperture 273 have an inlet in the first surface 241A and an outlet in the second surface 243A. Similarly, the second annular wall 250 has a first surface 241B facing away from the combustion zone and a second surface 243B facing the combustion zone. The second annular wall 250 has a plurality of effusion cooling apertures 269 extending there-through from the first surface 241B to the second surface 243B to provide a film of coolant onto the inner surface 243B of the second annular wall 250. The effusion cooling aperture 269 have an inlet in the first surface 241B and an outlet in the second surface 243B. The first surface 241A of the first annular wall 246 has at least one particle separator positioned upstream of an effusion cooling aperture 273 and/or the first surface 241B of the second annular wall 250 has at least one particle separator positioned upstream of an effusion cooling aperture 269. The first surface 241A of the first annular wall 246 may have a plurality of particle separators, each particle separator is positioned upstream of one of the effusion cooling apertures 273 and/or the first surface 241B of the second annular wall 250 may have a plurality of particle separators, each particle separator is positioned upstream of one of the effusion cooling apertures 269. The particle separators may be as shown and described with reference to FIGS. 4 and 5, FIGS. 4 and 6, FIGS. 4 and 7 or FIGS. 4 and 8.

Figure 12:
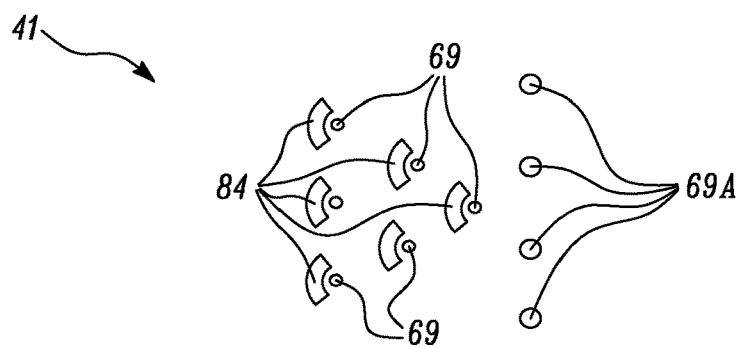
FIG. 12 is a further plan view of the combustion chamber tile in the direction of arrow A in FIG. 4.

FIG. 12 shows an arrangement in which the wall have a first plurality of effusion cooling apertures 69 and a second plurality of effusion cooling apertures 69A. The first surface 41 of the wall has a particle separator 84 located at least partially upstream of the inlet of each one of the first plurality of effusion cooling apertures 69. The second plurality of effusion cooling apertures 69A are located downstream of the first plurality of effusion cooling apertures 69 and the second plurality of effusion cooling apertures 69A have a greater cross-sectional area than the first plurality of effusion cooling apertures 69. In this arrangement any particles of sand, dust, grit, volcanic ash etc. which may block the first plurality of effusion cooling apertures 69 are deflected, or centrifuged, away from, over, the inlets of the effusion cooling apertures 69, 73 while the coolant, air, is allowed to flow into the inlets of, and through, the effusion cooling apertures 69, 73. However, the second plurality of effusion cooling apertures 69A may be interspersed within the first plurality of effusion cooling apertures 69. In this arrangement any particles of sand, dust, grit, volcanic ash etc. which may block the first plurality of effusion cooling apertures 69 is allowed to flow through the second plurality of apertures 69A to avoid accumulation of particles sand, dust, grit, volcanic ash etc. in the chamber between the tiles 48A, 48B, 48C, 52A, 52B, 52C and the first and/or third annular walls 46, 50.

In all the arrangements the inlet of the effusion cooling aperture 69, 73 in the first surface may be circular, elliptical, race-track or other suitable shape. In all the arrangements the effusion cooling aperture 69, 73 may have a circular cross-section or a rectangular cross-section. The outlets of the effusion cooling apertures 69, 73 may be circular, elliptical, race-track, fan shaped or parallelogram shaped.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A combustion chamber comprising a wall at least partially defining a combustion zone, the wall having an upstream end and a downstream end, the wall having a first surface facing away from the combustion zone and a second surface facing the combustion zone, the wall having at least one effusion cooling aperture extending there-through from the first surface to the second surface, the effusion cooling aperture having an inlet in the first surface and an outlet in the second surface, the first surface having a particle separator at least partially located upstream of the inlet of the effusion cooling aperture, the particle separator projecting away from the first surface and away from the combustion zone, the particle separator having a distal end remote from the inlet of the effusion cooling aperture and a proximal end adjacent to the inlet of the effusion cooling aperture, the particle separator having a maximum height above the first surface at a location spaced from the proximal end, the particle separator increasing in height in a direction from the distal end towards the proximal end to the maximum height,
wherein the maximum height of the particle separator is equal to or greater than a diameter of the effusion cooling aperture,
the particle separator overhangs the inlet of the effusion cooling aperture,
the particle separator has a first portion adjacent the distal end, a second portion adjacent the proximal end and a third portion between the first portion and the second portion, the first portion having a curved surface from the first surface of the wall to the third portion,
the curved surface of the first portion is an arc of a circle, having a radius of four to twelve times the diameter of the effusion cooling aperture,
the second portion comprises a first curved surface, a second curved surface, and a linear surface between the first curved surface and the second curved surface, the first curved surface, the linear surface and the second curved surface are arranged in series between a junction with the third portion and the first surface of the wall,
the first curved surface of the second portion is an arc of a circle having a radius of one tenth of the diameter of the effusion cooling aperture, and
the second curved surface of the second portion is an arc of a circle having a radius of three tenths to twelve tenths of the diameter of the effusion cooling aperture.

2. The combustion chamber as claimed in claim 1, wherein the third portion has a linear surface.

3. The combustion chamber as claimed in claim 1, wherein the diameter of the effusion cooling aperture is in a range of 0.3 to 1.0 mm.

4. The combustion chamber as claimed in claim 1, wherein the effusion cooling aperture is arranged at an angle of 20° to 50° to the first surface.

5. The combustion chamber as claimed in claim 1, wherein the particle separator has a rectangular base.

6. The combustion chamber as claimed in claim 1, wherein the proximal end of the particle separator curves around the effusion cooling aperture.

7. The combustion chamber as claimed in claim 1, wherein the third portion has a frusto-conical surface.

8. The combustion chamber as claimed in claim 1, wherein the inlet of the effusion cooling aperture in the first surface is circular, elliptical, or race-track.

9. The combustion chamber as claimed in claim 1, wherein the wall has a plurality of effusion cooling apertures, the first surface of the wall has a plurality of particle separators, each particle separator is located at least partially upstream of the inlet of a respective one of a plurality of effusion cooling apertures.

10. The combustion chamber as claimed in claim 9, wherein the wall has a first plurality of effusion cooling apertures, each particle separator is located at least partially upstream of the inlet of a respective one of the first plurality of effusion cooling apertures, a second plurality of effusion cooling apertures, and the second plurality of effusion cooling apertures having a greater cross-sectional area than the first plurality of effusion cooling apertures.

11. A gas turbine engine for an aircraft comprising:
an engine core comprising a turbine, a compressor, a combustion chamber and a core shaft connecting the turbine to the compressor; and
a fan located upstream of the engine core, the fan comprising a plurality of fan blades,
wherein the combustion chamber comprises a wall at least partially defining a combustion zone, the wall having an upstream end and a downstream end, the wall having a first surface facing away from the combustion zone and a second surface facing the combustion zone, the wall having at least one effusion cooling aperture extending there-through from the first surface to the second surface, the effusion cooling aperture having an inlet in the first surface and an outlet in the second surface, the first surface having a particle separator at least partially located upstream of the inlet of the effusion cooling aperture, the particle separator projecting away from the first surface and away from the combustion zone, the particle separator having a distal end remote from the inlet of the effusion cooling aperture and a proximal end adjacent to the inlet of the effusion cooling aperture, the particle separator having a maximum height above the first surface at a location spaced from the proximal end, the particle separator increasing in height in a direction from the distal end towards the proximal end to the maximum height,
the maximum height of the particle separator is equal to or greater than a diameter of the effusion cooling aperture,
the particle separator overhangs the inlet of the effusion cooling aperture,
the particle separator has a first portion adjacent the distal end, a second portion adjacent the proximal end and a third portion between the first portion and the second portion, the first portion having a curved surface from the first surface of the wall to the third portion,
the curved surface of the first portion is an arc of a circle having a radius of four to twelve times the diameter of the effusion cooling aperture,
the second portion comprises a first curved surface, a second curved surface, and a linear surface between the first curved surface and the second curved surface, the first curved surface, the linear surface and the second curved surface are arranged in series between a junction with the third portion and the first surface of the wall, the first curved surface of the second portion is an arc of a circle having a radius of one tenth of the diameter of the effusion cooling aperture, and the second curved surface of the second portion is an arc of a circle having a radius of three tenths to twelve tenths of the diameter of the effusion cooling aperture.

12. The combustion chamber as claimed in claim 1, wherein the third portion increases in height at a constant rate between the first portion and the maximum height.

13. The combustion chamber as claimed in claim 1, wherein the maximum height is at a junction between the third portion and the second portion.

14. The combustion chamber as claimed in claim 6, wherein the particle separator has a part annular base.

* * * * *